United States Patent
Roberts et al.

(10) Patent No.: US 6,760,149 B2
(45) Date of Patent: Jul. 6, 2004

(54) COMPENSATION OF POLARIZATION DEPENDENT LOSS

(75) Inventors: Kim B. Roberts, Nepean (CA); Steven Frisken, Vaucluse (AU); Richard Habel, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 52 days.

(21) Appl. No.: 10/191,246

(22) Filed: Jul. 8, 2002

(65) Prior Publication Data

US 2004/0004755 A1 Jan. 8, 2004

(51) Int. Cl.$^7$ .............................................. H01L 3/00
(52) U.S. Cl. ..................................... 359/337; 398/158
(58) Field of Search ............................ 359/337, 337.1, 359/158

(56) References Cited

U.S. PATENT DOCUMENTS

| | | | | |
|---|---|---|---|---|
| 5,481,391 | A | * 1/1996 | Giles | 359/179 |
| 6,147,757 | A | 11/2000 | Shen et al. | 356/364 |
| 6,347,164 | B1 | 2/2002 | Rudkevich | 385/11 |
| 6,549,331 | B2 * | 4/2003 | Walker et al. | 359/344 |
| 6,570,699 | B2 * | 5/2003 | Onaka et al. | 359/281 |
| 6,597,839 | B2 * | 7/2003 | Mihailov et al. | 385/37 |

FOREIGN PATENT DOCUMENTS

JP 10-20145 * 10/1998

OTHER PUBLICATIONS

"Demonstration of In–Line Monitoring and Dynamic Broadband Compensation of Polarization Dependent Loss". L.S. Yan; Q.Yu; and A.E. Willner, Dept. of Electrical Engineering–Systems, EEB–500, University of Southern California, Los Angeles, CA 90089, U.S.A. .
"WDM Polarization Controller in PLC Technology".
Lothar Möller—IEEE Photonics Technology Letters, vol. 13, No. 6. Jun. 2001.
"Polarization Effects in Optical Communication Systems".
Aurenice O. Lima—ENEE 635/785B: Enabling WDM Technologies Final Report (Fall2001) Department of Computer Sciences and Electrical Engineering, University of Maryland, Baltimore MD 21250, U.S.A. .

* cited by examiner

Primary Examiner—Mark Hellner
(74) Attorney, Agent, or Firm—Pearne & Gordon LLP (57) ABSTRACT

In a method of compensating polarization dependent loss (PDL) in a wave division multiplex (WDM) optical communications system, a performance parameter is monitored at a predetermined monitoring point. The performance parameter is indicative of respective channel PDL for each one of a plurality of channels of the optical communications system. A error function is calculated as a function of wavelength across a wavelength spectrum of interest, using the measured performance parameter values. Finally, a broadband PDL compensator is controlled based on the calculated error function.

29 Claims, 5 Drawing Sheets

COMPENSATION OF POLARIZATION DEPENDENT LOSS

CROSS-REFERENCE TO RELATED APPLICATIONS

This is the first application filed for the present invention.

MICROFICHE APPENDIX

Not Applicable.

TECHNICAL FIELD

The present invention relates to optical communications systems, and in particular to a method and system for dynamic broadband compensation of polarization dependent loss within an optical communications system.

BACKGROUND OF THE INVENTION

Optical communications systems typically include a pair of network nodes connected by an optical waveguide (i.e., fiber) link. Within each network node, optical signals are converted into electrical signals for signal regeneration and/or routing. Exemplary network nodes of this type include Add-Drop-Multiplexers (ADMs), routers, and cross-connects. The optical link between the network nodes is typically made up of multiple concatenated optical components, including two or more (and possibly 20 or more) optical fiber spans (e.g., of 40–60 km in length) interconnected by optical (e.g., Erbium doped fiber) amplifiers.

The use of concatenated optical components within the link enables improved signal reach (that is, the distance that an optical signal can be conveyed before being reconverted into electrical form for regeneration). Thus, for example, optical signals are progressively attenuated as they propagate through a span, and amplified by an optical amplifier prior to being launched into the next adjoining span. However, each optical component introduces polarization dependent effects, which may be manifested as either polarization dependent loss (in the case of filters, isolators, and fiber), or polarization dependent gain (in the case of optical amplifiers). Furthermore, within discrete optical components such as filters, isolators and amplifiers, the polarization dependent effects are typically a function of wavelength. Within optical fiber, polarization dependent losses are a function of wavelength, but may also vary with stress, bending radius, and vibration of the fiber.

When considering the effects of polarization dependent loss/gain on an optical signal, it is convenient to consider the polarization dependent effect (PDE) as a vector quantity, and this terminology is used herein. A more rigorous treatment of PDE is provided in "Polarized Light" (Edward Collett, ISDN 0-847-8729-3). Therefore, when multiple optical components are concatenated to form an optical link, the PDE exhibited by the resulting system is the vector sum of the polarization dependent effects introduced by each of the various components, transformed by the polarization coupling between successive elements along an optical fiber route. Because the PDE of fiber is affected by environmental conditions (e.g. temperature and mechanical stress), and optical switches within the network can dynamically change the topology of a connection, the vector sum of PDE will tend to be a bounded statistical entity changing at a rate of up to tens of Hz.

Optical communications systems suffer degradation attributed to PDL generally through transients and through noise. Transient changes in the polarization couplings along a fiber route cause a transient change in the received power of a polarized signal, which cause errors in the receiver. Furthermore, Amplified Spontaneous Emission (ASE) noise is generally unpolarized, and so PDL along an optical fiber route can attenuate the polarized signal and not attenuate the ASE noise travelling with that signal. This will further impair the optical signal-to-noise ratio. It should be noted that the ASE noise is actually polarized by this process which reduces the effect of the noise upon the receiver, but downstream PDL tends to map much of the orthogonally polarized ASE back into the same polarization as the signal.

Undersea systems generally use polarization scrambling to mitigate the effects of PDL as disclosed in U.S. Pat. No. 5,416,626, entitled "Optically Amplified Communications Systems", which issued on May 16, 1995. It is further known to attempt to minimize the PDL introduced by an optical device by improving the design of that device, or controlling the temperature of that device to a fixed value. However, in order to mitigate the deleterious effects of PDL inherent in an optical link, it is, therefore, desirable to be able to accurately compensate PDL dynamically. For WDM communications systems, this functionality must be implemented across a wavelength range that encompasses the optical signal traffic.

Various systems have been proposed for addressing this requirement for broadband dynamic PDL compensation. A typical example is described in "Demonstration of In-Line Monitoring and Dynamic Broadband Compensation of Polarization Dependent Loss" (L.-S. Yan, Q. Yu, and A. E. Willner, paper We.P.38, ECOC'2001). In this system, broadband PDL compensation is achieved by demultiplexing the optical signal traffic to separate each channel signal into a respective parallel optical path. The PDL of each of the separated channel signals is then independently measured and compensated, in parallel, and the thus "PDL-compensated" channel signals subsequently multiplexed back together.

A limitation of this approach is that WDM systems that achieve high spectral efficiencies (e.g., better than about 0.3 bits per second per Hz) generally suffer significant distortion penalties for each multiplexing and demultiplexing function. In addition, per-channel PDL compensation inherently introduces "deadbands" between channels. Within these deadbands, optical signals cannot be transmitted and PDL cannot be compensated. This tightly ties the PDL compensation system to the particular wavelength plan of the communications system, which is undesirable.

A known method of broadband PDL compensation that avoids deadbands is to impose a selected PDL across a wavelength band of interest (e.g. 5–6 nm wide). However, PDL can exhibit a strong wavelength dependence. Accordingly, the imposed PDL will normally be selected to compensate an average PDL within the wavelength band. While this approach avoids undesirable deadbands, it can only compensate a portion of the PDL within the wavelength band, leaving at least some PDL un-compensated.

Another method of reducing the accumulation of PDL in a optical fiber link is depolarization of the optical signal traffic. Such methods are taught in U.S. Pat. No. 6,205,262, for example. However, depolarization does not permit any dynamic equalization of PDL across a spectrum of channels.

Accordingly, a system capable of implementing broadband dynamic PDL compensation system, independently of a channel plan of the communications system, remains highly desirable.

SUMMARY OF THE INVENTION

An object of the present invention is to provide a system for dynamic broadband compensation of polarization dependent loss in an optical communications system.

Thus, an aspect of the present invention provides a method of compensating polarization dependent loss (PDL) in a wave division multiplex (WDM) optical communications system. In accordance with the present invention, a performance parameter is monitored at a predetermined monitoring point. The performance parameter is indicative of respective channel PDL for each one of a plurality of channels of the optical communications system. A error function is calculated as a function of wavelength across a wavelength spectrum of interest, using the measured performance parameter values. Finally, a broadband PDL compensator is controlled based on the calculated error function.

Another aspect of the present invention provides a system for compensating polarization dependent loss (PDL) in a wave division multiplex (WDM) optical communications system. The system comprises: a monitor; a signal processor; and a controller. The monitor is designed to measure a performance parameter indicative of respective channel PDL for each one of a plurality of channels of the optical communications system. The signal processor uses the measured performance parameter values to calculate an error function as a function of wavelength across a wavelength spectrum of interest. Finally, the controller uses the calculated error function to control a broadband PDL compensator.

The performance parameter may be directly or indirectly indicative of PDL. Directly indicative performance parameters include: directly measured polarization direction of each channel; and measured optical power levels of each mode of each channel. Indirectly indicative performance parameters include channel bit error rate (BER) and Signal to Noise (S/N) ratio.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The following description of preferred embodiments, and the claims, refer to compensation of polarization dependent loss (PDL); that is, differential attenuation of optical signal modes depending on the polarization direction. It will be appreciated, however, that the same description applies equally to polarization dependent gain. Thus, each reference to polarization dependent loss (PDL) shall be understood to also include polarization dependent gain.

Figure 1:
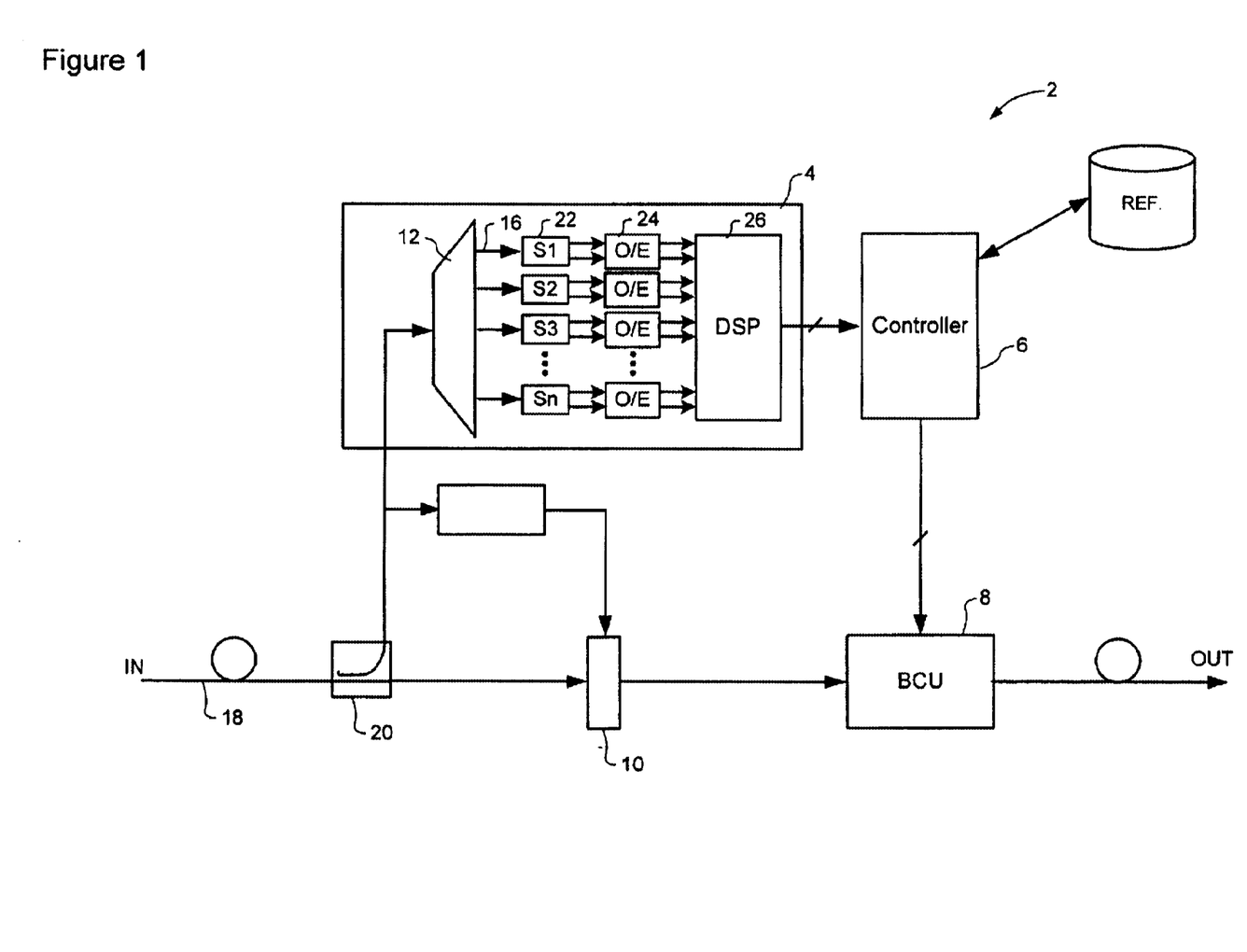
FIG. 1 is a block diagram schematically illustrating principle elements in a dynamic PDL compensation system in accordance with an embodiment of the present invention.

The present invention provides a system for broadband dynamic compensation of PDL within an Wavelength Division Multiplexed (WDM) optical communications system. FIG. 1 is a block diagram schematically illustrating principle elements of a PDL compensation system in accordance with the present invention.

As shown in FIG. 1, the PDL compensation system 2 generally comprises a monitor 4; a controller 6; and a broadband PDL compensation unit 8. If desired, a polarization rotator 10 may be used to convert arbitrary polarization of inbound optical signal traffic into an aligned polarization state, in a manner known in the art.

The monitor 4 is designed to measure a selected performance parameter across a wavelength band that encompasses the optical signal traffic within the communications system. Any performance parameter that is indicative of polarization dependent effects may be used for this purpose. Preferably, a performance parameter that is directly indicative of PDL is used. Exemplary performance parameters of this type include per-channel polarization direction, and respective optical power levels of the optical modes of each channel signal. Alternatively, indirect performance parameters, such as signal-to-noise (S/N) ratio, and bit error rate, may be used. In the embodiment of FIG. 1, the monitor 4 is provided as a "full vector" monitor, which outputs a vector array of optical mode power values across a range of wavelengths. Thus, the monitor 4 is provided with an optical demultiplexer 12 for demultiplexing a composite light beam 14 to separate each of the channel signals 16. The composite light beam 14 can be obtained by tapping the optical signal traffic in a fiber 18 of the communications system using, for example, a convention 5% optical tap 20. The respective optical modes of each channel 16 are separated using, for example, a conventional polarization beam splitter 22 and detected by an optical-to-electrical (O/E) converter 24. If desired, a Digital Signal Processor (DSP) 26 can be provided to analyze the detected optical mode power levels to output the vector arrays in a desired format. As will be appreciated, the values of the vector array will (for the full vector monitor 4 of FIG. 1) be directly indicative of PDL across the range of wavelengths of the optical signal traffic within the fiber 18. The monitor 4 can be provided as a discrete element, or integrated within a larger performance monitoring system, as desired.

It will be appreciated that the monitor 4 may employ other known techniques to measure PDL values across a wavelength range of interest, such as, for example, as described in applicant's co-pending U.S. patent application Ser. No. 09/975,985. Alternatively, the performance parameter may provide an indirect indication of PDL. For example, most conventional performance monitoring systems calculate a bit error rate for each channel. Since the bit error rate is a function of the S/N ratio, which, in turn, is related to PDL, the bit error rate for each channel may be used as an indicator of PDL. Thus it will be appreciated that the present invention is in no way intended to be limited to the embodiment of FIG. 1.

The controller 6 unit uses the performance parameter measured by the monitor 4 to calculate an error function indicative of a difference between the measured performance parameter and a predetermined reference that will normally represent a desired (or optimum) performance of the optical communications system. The controller 6 then uses the error function to adjust control settings of the BCU 8 in order to control the BCU 8 to impose a polarization dependent loss that minimizes the error function. This functionality will naturally be dependent on the operational characteristics of the BCU 8, as will be described in greater detail below.

The reference used for calculating the error function may be substantially fixed. For example, in the embodiment of FIG. 1, the measured performance parameter consists of a pair of arrays of measured per channel optical power levels, for each of the two orthogonal polarization directions. In this case, a suitable fixed reference may be defined at a time of installation of the PDL compensation system 2. An exemplary fixed reference that may conveniently be used includes a "zero difference" reference, which is defined such that the error function will represent the difference between the respective power levels of the two polarization directions. In this case, the controller 6 can readily use the error function to control the BCU 8 to minimize this difference. Alternatively, a floating reference may be used. For example, the controller 6 may calculate a target power level that corresponds to a minimum power level detected by the monitor 4. In this case, the target power level can be used as a "floating" reference, so that the error function will represent the difference between the measured power levels and the target power level, and the controller 6 will operate to control the BCU 8 to minimize this difference. As a still further alternative, a "dynamic" reference can, for example, take the form of a second performance parameter array generated by a second monitor, as will be described in greater detail below.

As may be appreciated, various methods may be used to control the BCU 8 to provide optimized compensation of PDL. In embodiments in which the measured performance parameter is directly indicative of PDL (as in the embodiment of FIG. 1, for example) a simple first-order control loop can be used to calculate an error function and control the BCU 8 to impose equal and opposite PDL. In cases where PDL is "indirectly" measured (e.g., using bit error rate as an indicator of PDL), various known iterative techniques can be utilized to find BCU control settings that optimize the performance of the communications system.

For a compensator 8 that may only compensate linear PDL (i.e., not being able to compensate the circular components), the same control methods described above may be used. However, in this case, only those portions of the PDL that map onto the two linear polarization vectors can be compensated. Therefore, half of the RMS value of the accumulated PDL up to that point in the link can be compensated on average. The other half is circularly polarized but will generally have random polarization upon reaching the next compensator downstream. This compensation method does not reduce the peak amount of PDL but, instead, significantly lowers the mean PDL and lowers the probability of exploring the upper tail of the probability distribution of PDL values. In an oversimplified example, if there is no additional PDL downstream of a first compensator in a system employing N such compensators, and the polarization couplings between the N compensators is uniformly random and independent, then the mean residual PDL is $2^{-N}$ of the original value. For a system having equal amounts of PDL, X, introduced between each compensator and with the polarization couplings between the N compensators being uniformly random and independent, the mean residual PDL after the last compensator will be less than X for any value of N.

As may be appreciated, one or more broadband PDL compensation units 8 may be provided along a link between nodes of an optical communications system. Typically, each BCU 8 will be associated with a PDL measurement point (and, usually, a monitor 4). However, in some instances (particularly those in which indirect methods are used to indicate PDL), the measurement point (and monitor) may be remote from the BCU 8. Maximum performance (at least in terms of rapid response) can be obtained by providing a local controller 6 for each BCU 8. However, where response delays can be tolerated, a centralized controller 6 can be used to control the operation of one or more BCU's 8.

Figure 2A:
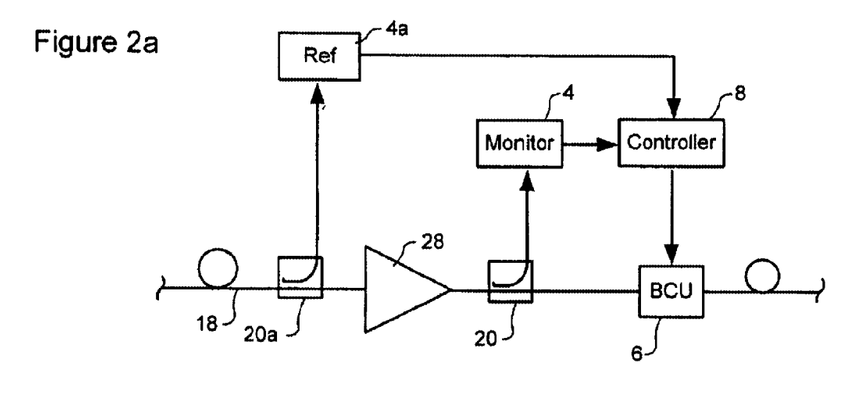
FIGS. 2a–c illustrate respective alternative implementations of the dynamic PDL compensation system in accordance with the present invention, deployed in an optical communications system.
Figure 2B:
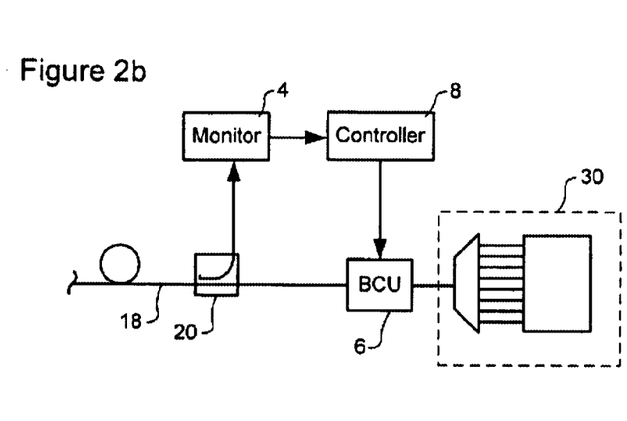
Figure 2C:
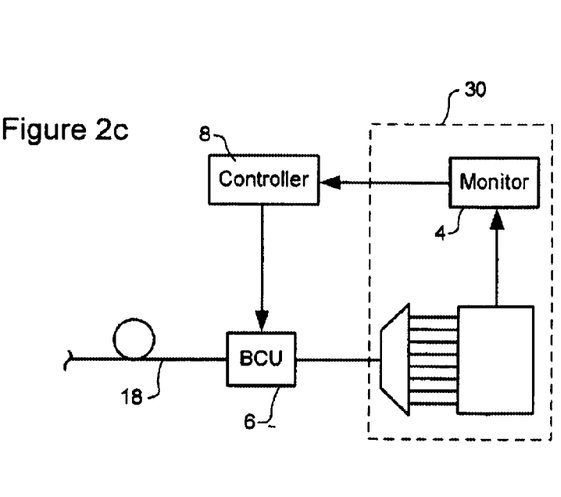

FIGS. 2a–c illustrate respective exemplary implementations of the PDL compensation system 2 of the present invention. FIG. 2a depicts an embodiment of the PDL compensation system 2 implemented for the minimization of local PDL of an optical amplifier 28. In this case, the goal is to minimize the PDL of the amplifier 28 without regard to the PDL introduced by any upstream components. It is well known that the polarization coupling within a single amplifier shelf will generally be stable, varying slowly with environmental temperature. However, the polarization couplings due to fiber connecting various shelves will generally be much more variable.

As shown in FIG. 2a, PDL introduced by the amplifier 28 can be compensated by monitoring the same performance parameter both immediately upstream and downstream of the amplifier 28. The monitored upstream parameter value(s) can be used as the reference, and the error function found by subtracting the downstream parameter value(s) from this reference. The controller 6 can then control the BCU 8 to minimize the error function. A simple first order control loop can be used to dynamically track and compensate the PDL of the amplifier 28 in this manner. Because the PDL of discrete optical components, such as amplifiers, tends to vary slowly with time, a high-speed response is not necessary. Thus the monitors 4 and controller 6 can be remote from the BCU 8, if desired. In this case, however, no attempt would normally be made to compensate for the PDL present at the input to the amplifier 28, as that PDL will change more rapidly than the relatively slow control loop can track. Improperly tracked PDL compensation merely increases the amount of transient PDL.

FIGS. 2b and 2c illustrate alternative implementations of the broadband PDL compensations system 2, for compensating (possibly rapidly changing) PDL upstream of a discrete network element. In the embodiment of FIG. 2b, a monitor 4 is associated with the BCU 8, and is closely coupled to a local controller 6. In principle, such an embodiment can be provided at any desired location along a network link, to provide high-speed dynamic PDL compensation. The embodiment of FIG. 2c utilizes the optical signal processing and performance monitoring functionality of a network node 30 to monitor PDL. Such an embodiment will typically be appropriate in cases where the node 30 is capable of measuring PDL across the wavelength band of interest, or alternatively, where an indirect indicator of PDL (e.g., per-channel bit error rate) is used as the basis of PDL compensation.

If desired, local PDL compensation at each of several points along a network link may be controlled so as to produce an optimum distribution of PDL compensation along the link. For example, as described in co-owned and co-pending U.S. patent application Ser. No. 09/956,557 filed on Sep. 20, 2001, the contents of which is hereby incorporated herein by reference, the bit error rate (BER), or, if desired, S/N ratio, can be measured on a per-channel basis at a receiving end of an optical link. The control settings used for controlling each discrete optical device along that link can be individually perturbed, and the perturbations correlated with changes in the measured BER. By iteratively perturbing control settings and monitoring corresponding changes in the BER, a relationship between the BER at the receiving end of the link and the control settings of each optical device along the link can be determined. This relationship can be used (possibly in conjunction with a cost function) to calculate control setting values that will most nearly optimize the performance of the optical link as a whole.

This "global optical control" technique can be directly employed to implement centralized control of multiple BCUs 8 distributed along an optical link. In this case, the S/N ratio and/or the PDL (measured at the receiving end of the link) may equally be used in place of the BER, as the basis of for determining optimal control parameter values. If desired, S/N ratios can be measured at multiple points along an optical link, and used as the basis of link performance optimization.

Given the speed of light delays in long systems and the time delays associated with measurements and device responses, the "global optical control" technique of optical performance optimization will be best suited to slow optimization for the compensation of local PDL. Optimizing for the best steady state receiver signal quality will also minimize the size of PDL transients, as fast changes in the polarization coupling between amplifier nodes will not cause large transients if the PDL at those nodes has been substantially compensated. Where high-speed PDL compensation is required, BCUs 8 with local PDL monitoring and controllers 6, as shown in FIGS. 1 and 2a,b can be deployed at selected locations along the link.

As mentioned above, the nature and degree of PDL compensation achieved by the controller 6 and BCU 8 will be largely dependent on the operational characteristics of the BCU 8. For the purposes of the present disclosure, PDL compensation is described below for each of two classes of broadband compensator units 8, namely, a full-vector BCU, and a linear BCU.

FIGS. 3 through 6 schematically illustrate operation of a broadband dynamic PDL compensation system using a full vector broadband compensator unit 8. As shown in FIG. 3a, an exemplary full vector BCU 8 generally comprises a beam splitter 32; a beam combiner 34; a defraction element 36; and an attenuator array 38. The beam splitter 32, which may be provided as either a conventional polarization beam splitter or a birefringent crystal, operates to divide an inbound light beam 40 from an input fiber 42 into a pair of beams 44, based on the polarization direction. By suitably aligning the polarization directions of the inbound light beam 40 from the input fiber 42 with the principal axes of the beam splitter 32 (e.g., using polarization rotator 10), it is possible to obtain spatial separation of the optical modes across all channels of the communication system. Thus, in the example of FIG. 3a, a first light beam 44a emerging from the beam splitter 32 contains all of the vertically polarized modes of the inbound light beam 40, while the other beam 44b contains all of the horizontally polarized modes. Each beam 44 is made incident on a defraction element 36 (such as, for example, a conventional defraction grating) in order to cause a spatial separation of each beam 44 on a per wavelength basis. Defracted light of each beam 44 is then made incident on a respective attenuator array 38 which causes per-wavelength attenuation of the light, as will be described in greater detail below. Recombination of the attenuated light into an outbound light beam 46 directed into an output fiber 48 can be accomplished using defraction element 36 to recombine the detracted light of each mode into respective outbound light beams 50 directed toward the beam combiner 34 which, in turn, combines the two light beams 50 into a single composite outbound light beam 46 that emerges from the compensation unit 8 and is directed into the output fiber 48.

Figures 3A, 3B:
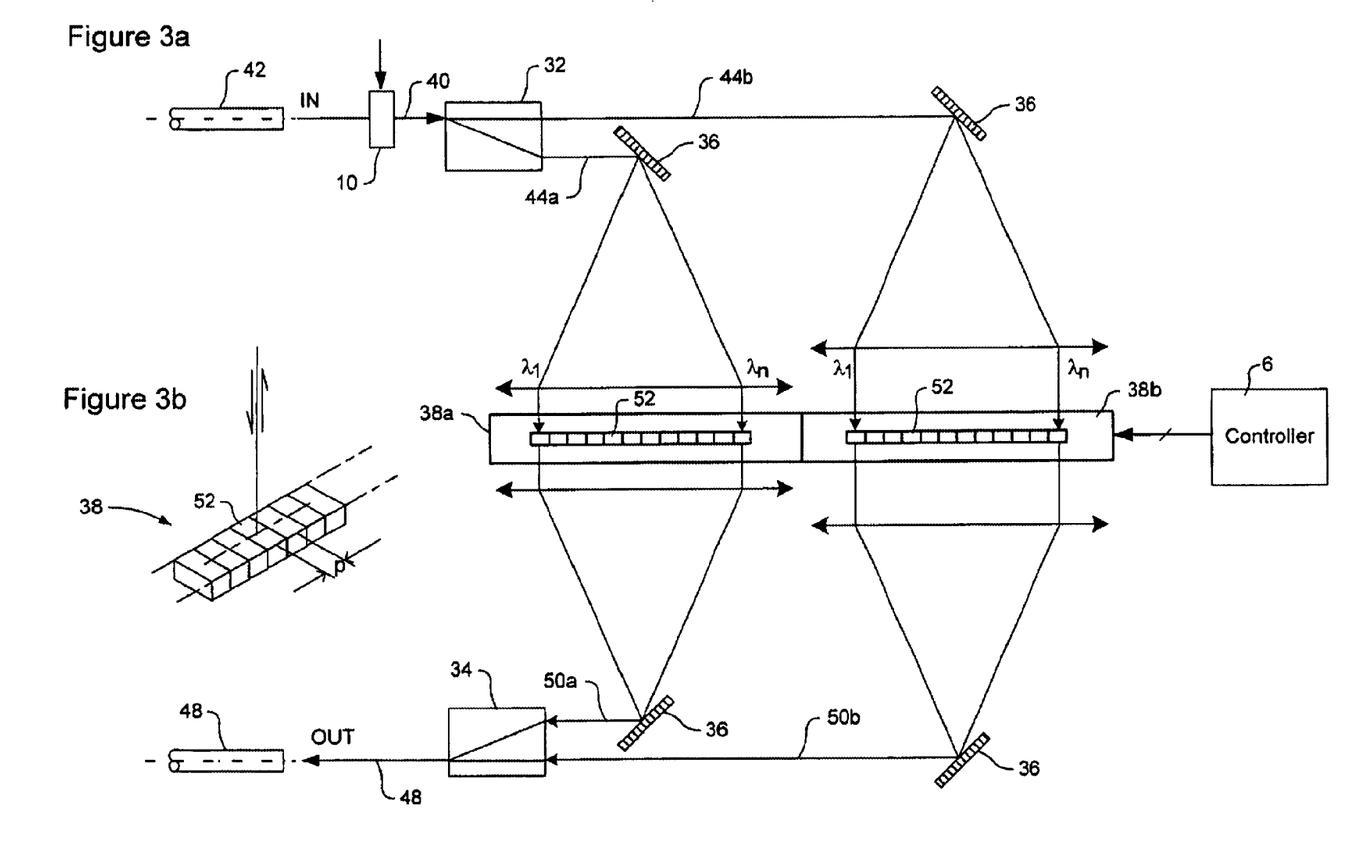
FIGS. 3a and 3b illustrate principle elements and operation of a full-vector broadband PDL compensation unit usable in the embodiment of FIGS. 1 and 2.

As shown in FIG. 3a, the BCU 8 is arranged as a "flow-through" device, in which inbound and outbound light beams 44 and 50 follow different paths. It will be appreciated, however, that the BCU 8 may equally be arranged using a "folded" configuration. In this case, a mirror (not shown) positioned behind the attenuator arrays 38 is used to reflect the attenuated light back through the arrays 38, so that the light retraces its inbound path toward the beam splitter 32, which also serves as the beam combiner 34 to form the outbound light beam 46. In this case, a conventional optical circulator (not shown) can be used to route the outbound light beam 46 into the output fiber 48.

As mentioned previously, each attenuator array 38 is independently controlled to provide per wavelength attenuation of incident light. Various methods are known in the art for implementing a controllable attenuation of incident light. For example, a liquid crystal may be used to produce a phase delay or polarization rotation that is proportional to a voltage applied across the liquid crystal material. As is well known in the art, this characteristic may be used (possibly in combination with filters or other optical elements) to provide precisely controlled attenuation of light, based on polarization direction. Wavelength-dependent attenuation control can be obtained by dividing the liquid crystal into an array of individually controllable cells, or attenuator elements 52. With this arrangement, each attenuator element 52 operates to produce a controlled attenuation of incident light, independent of the operation of adjacent elements 52. This arrangement enables an arbitrary attenuation profile to be obtained across the full range of wavelengths of the inbound light beam 40, independent of the channel plan of the communications system. Full vector PDL compensation using this arrangement will be described below with reference to FIGS. 4 through 6.

For the purposes of control, it is convenient to define a respective center wavelength for each attenuator element 52, which corresponds to the wavelength of light that is incident on the center portion of the attenuator element 52, as shown in FIG. 3b. This means that each attenuator element 52 will have a respective different center wavelength, and the set of center wavelengths will be substantially evenly distributed across the entire range of wavelengths of the inbound light beam 40. In order to facilitate PDL compensation, each attenuator element 52 of one array 38a is preferably matched with a corresponding attenuator element 52 in the other array 38b that has the same center wavelength. Thus PDL compensation can be accomplished by differentially controlling corresponding elements 52 in each of the arrays 38a,b. It will be appreciated that the center wavelengths of the attenuator elements 52 may be substantially independent of the channel wavelengths of the optical communications system. If desired, there can be many more center wavelengths than channel wavelengths, and any given center wavelength may or may not correspond to a channel wavelength.

Figure 4:
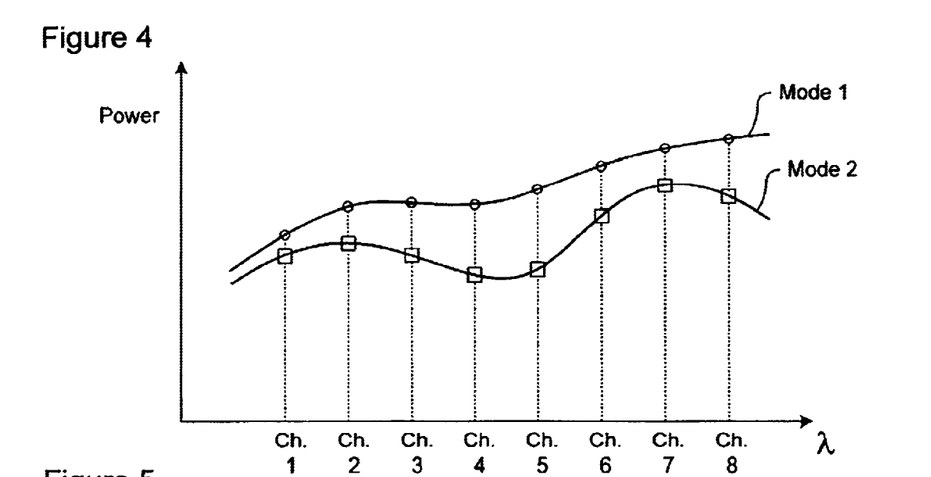
FIG. 4 is a chart showing exemplary power variations as a function of wavelength detected by the monitor of FIG. 1.

As described above, the full vector monitor 4 of FIG. 1 operates to measure the respective optical power of the two orthogonally polarized optical modes of each channel 16 of the optical signal traffic. For the purposes of illustration, the resulting array(s) of measured power values can be plotted on a chart of power versus wavelength, as shown in FIG. 4. For each optical mode, a best fit curve can be mapped through the data points to enable estimation of optical power levels at wavelengths lying between adjacent channels. Alternatively, linear interpolation may be used for this purpose. In either case, the error function values can be determined as the difference between the respective power profiles of the two polarization modes, and plotted against wavelength, as shown in FIG. 5.

Figure 5:
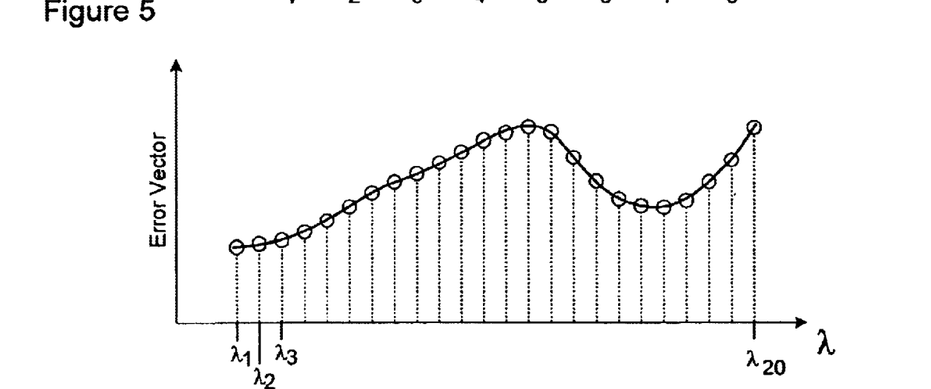
FIG. 5 is a chart showing an exemplary error function as a function of wavelength derived from the power profiles of FIG. 4.

Using the error function profile shown in FIG. 5, the optical attenuation required to compensate PDL at each center wavelength can readily be determined. It is then a simple matter to differentially control corresponding attenuator elements 52 in each of the two attenuator arrays 38 to provide an equal and opposite PDL for each center wavelength. As may be appreciated, liquid crystal polarization rotators (in combination with filters or other optical elements) are capable of causing a wide range of optical attenuation (from close to zero through to extinction), thereby enabling virtually any degree of PDL to be effectively compensated using this technique.

Figure 6:
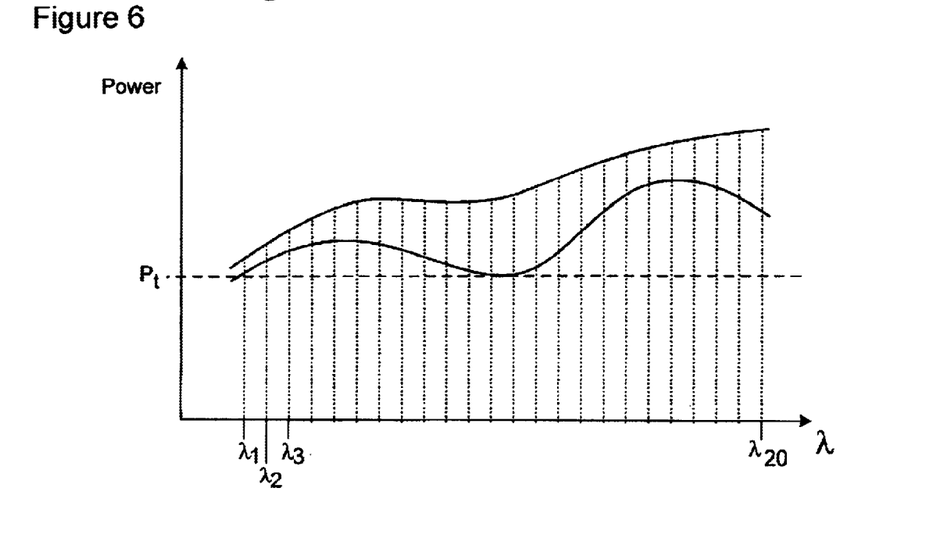
FIG. 6 is a chart illustrating operation of the full-vector broadband PDL compensation unit of FIG. 3.

FIG. 6 illustrates another method of controlling the compensation unit 8 of FIG. 3 to provide PDL compensation. As shown in FIG. 6, the reference takes the form of a target power level ($P_T$) defined using, for example, the lowest optical power detected by the monitor 4. In this case, the error function represents, for each optical mode, the difference between the detected optical power and the target power level $P_T$ at each center wavelength. Using this arrangement, each attenuator element 52 is controlled to attenuate its respective center wavelength to that of the target power level $P_T$, thereby simultaneously achieving PDL compensation and power equalization.

Figure 7:
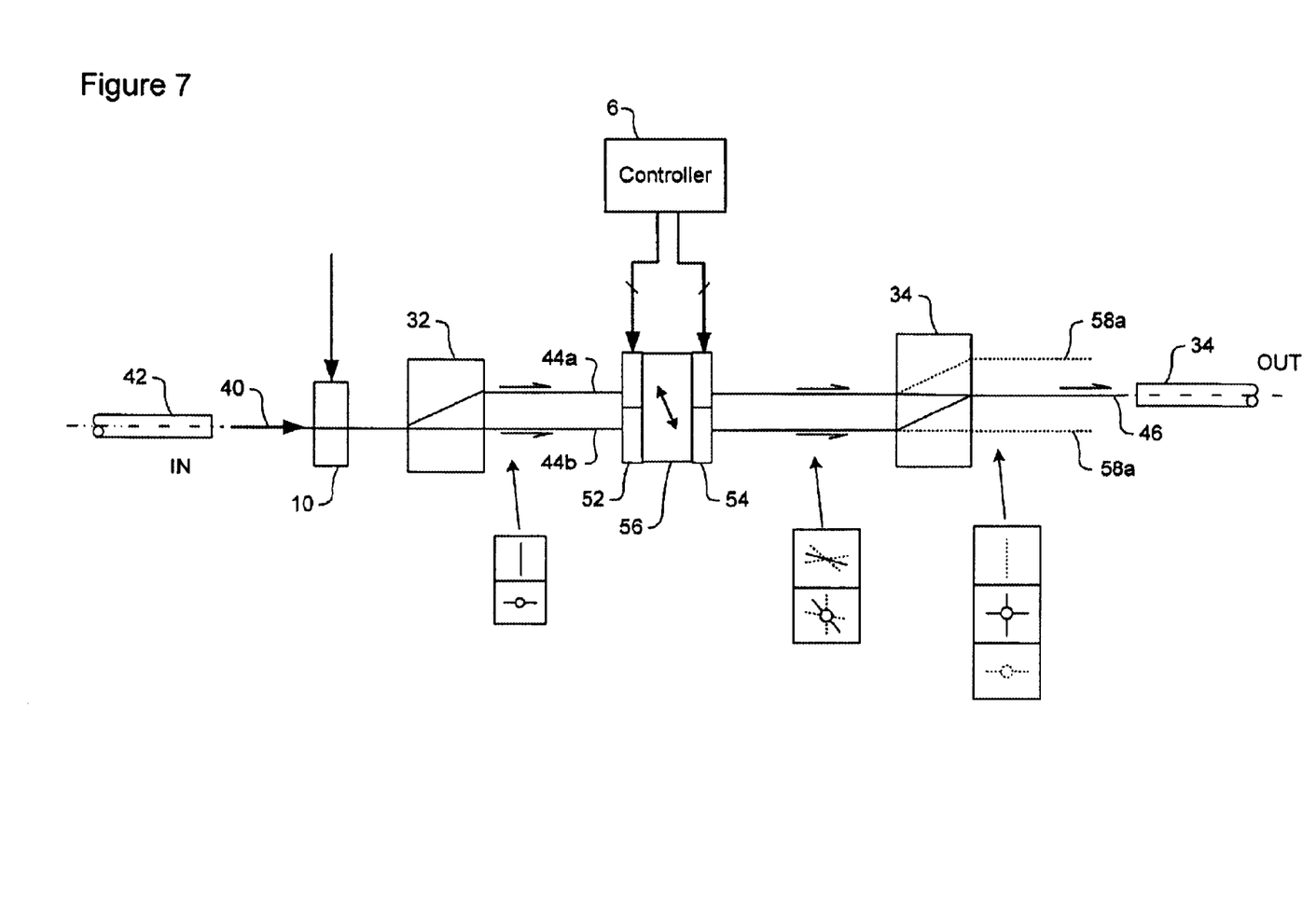
FIG. 7 is a block diagram schematically illustrating principle elements and operation of a linear broadband PDL compensation unit usable in the embodiment of FIGS. 1 and 2.

The broadband PDL compensation unit of FIGS. 3 through 6 is capable of providing full vector compensation of arbitrary PDL across the full range of wavelengths of the inbound light beam 40. As may be appreciated, decreasing the size of each element 52 increases resolution and reduces step-wise changes in optical attenuation. However, the implementation and control of large attenuator arrays 38 (i.e., with large numbers of small attenuator elements 52) tends to increase the cost and complexity of the polarization compensation system 2. The PDL of discrete optical devices (e.g., optical amplifiers) can be readily characterized at the time of manufacture, and is frequently substantially linear (at least within a reasonable approximation) across the range of wavelengths of interest. Consequently, where it is desired to provide compensation of PDL introduced by a discrete optical component, a substantially simpler, linear broadband compensation unit 8 may be used. FIG. 7 schematically illustrates operation of an exemplary linear broadband compensation unit 8, in which each optical mode is independently processed to cause an angular separation of light within each beam 44. This angular separation can then be used to control the efficiency with which light in each optical mode is coupled into the output fiber 48. This functionality will be described in greater detail below.

FIG. 7 shows principal elements of a linear BCU 8. As shown in FIG. 7, the linear BCU 8 comprises a beam splitter 32, first and second controllable polarization rotators 52 and 54 separated by a birefringent crystal 56, and a beam combiner 34. The beam splitter 32 operates in a conventional manner (in cooperation with polarization rotator 10) to spatially separate the two orthogonally polarized optical modes (across all wavelengths) into respective linearly polarized beams 44a,b in the same manner as described above with reference to FIG. 3a.

The controllable polarization rotators 52, 54 may, for example, be provided by conventional liquid crystal polarization rotators, cooperate with the birefringent crystal 56 so that light traversing the assembly will undergo a polarization dependent phase retardation which is a linear function of wavelength. Thus light emerging from the second controllable polarization rotator 54 will have a range of linear and elliptical polarization states. The maximum degree of ellipticity is a function of the thickness and birefringence of the biregringent crystal 56 and the angle between the polarization direction of the light and the principle axis of the biregringent crystal 56. This angle can be controlled by the first controllable polarization rotator 52.

The beam combiner 34 can be provided as a conventional birefringent crystal oriented to recombine the two modes into a composite outbound light beam 46. However, the efficiency with which light is coupled through the combinder 34 is a function of the angle between the polarization direction of the light and the principle axis of the combinder 34. This angle can be controlled by the second polarization rotator 54. Accordingly, wavelength-dependent optical attenuation can be controlled by controlling the phase retardation produced by the birefringent crystal 56 (by means of the first polarization rotator 52), and the mean polarization direction ($\phi_{mean}$) of the light incident on the beam combiner 34 (by means of the second polarization rotator 54).

In the embodiment of FIG. 7, the beam combiner 34 is oriented such that the horizontally polarized component of light from beam 44a is coupled into the output light beam 46 and directed into the output fiber 48; while the vertically polarized component of light from beam 44a is deflected to a side path 58a and does not couple into the output fiber 48. Conversely, the horizontally polarized component of light from beam 44b passes through the beam combiner 34 into a side path 58b and does not couple into the output fiber 48; while the vertically polarized component of light from beam 44b is deflected to the output light beam 46 and directed into the output fiber 48.

In the case of both beams 44a,b, the efficiency with which light is coupled from each beam 44 into the output fiber 48 varies sinusoidally with phase retardation and exhibits a controllable extinction. By suitably selecting the mean polarization directions ($\phi_{mean}$) of each beam 44, the combined PDL response as a function of wavelength can be controlled. It is also possible to introduce an arbitrary wavelength-independent component of loss to either one or both polarization directions, to produce a desired minimum PDL value.

As is known in the art, it is possible to construct virtually any arbitrary function by suitable addition of sinusoidal curves. Based on this principle, it may be seen that virtually any arbitrary attenuation profile across the wavelength band of interest may be compensated by cascading a suitable number of linear BCU units 8 of the type illustrated in FIG. 7.

The embodiments of the invention described above are intended to be exemplary only. The scope of the invention is therefore intended to be limited solely by the scope of the appended claims.

We claim:

1. A method of compensating polarization dependent loss (PDL) in an optical communications system having a broadband variable PDL compensator adapted to impose a selected wavelength-dependent attenuation of optical signal traffic, the method comprising a step of:

a) dynamically controlling the broadband PDL compensator to differentially attenuate light at each one of a plurality of selected wavelengths, at least one of the selected wavelengths lying between an adjacent pair of channel wavelengths of the optical communications system.

2. A method as claimed in claim 1, further comprising steps of:

a) measuring a respective performance parameter value indicative of PDL at each channel wavelength of the optical communications system;

b) calculating estimated performance parameter values at each selected wavelength; and c) calculating an error function as a function of wavelength based on the estimated performance parameter values.

3. A method as claimed in claim 2, wherein the measured performance parameter value is indirectly indicative of respective channel PDL of each channel of the communications system.

4. A method as claimed in claim 3, wherein the step of measuring performance parameter values comprises, for each channel of the optical communications system, a step of measuring one or more of: a respective channel bit error rate and a respective channel signal to noise ratio.

5. A method as claimed in claim 2, wherein the measured performance parameter value is directly indicative of respective channel PDL of each channel of the communications system.

6. A method as claimed in claim 5, wherein the step of measuring performance parameter values comprises, for each channel of the optical communications system, a step of measuring one or more of: a polarization vector of the channel signal; and measuring a respective power level of each orthogonal polarization of the channel signal.

7. A method as claimed in claim 2, wherein the step of calculating an error function comprises a step of calculating a difference between the estimated performance parameter values and a reference.

8. A method as claimed in claim 7, wherein the predetermined reference comprises either one of: a substantially fixed reference indicative of a desired performance of the optical communications system; and a second set of measured performance parameter values.

9. A method as claimed in claim 2, wherein the step of controlling a broadband PDL compensator comprises steps of:

a) estimating an optimized value of at least one control setting of the broadband PDL compensator, the estimated optimized control seting value being selected to minimize the error function; and b) applying the estimated optimized control setting value to the broadband PDL compensator.

10. A method as claimed in claim 9, wherein the step of estimating an optimized control parameter value comprises an initial step of determining a relationship between a change in the value of each control parameter and a corresponding change in the error function.

11. A method as claimed in claim 9, wherein the broadband PDL compensator is a full vector PDL compensator having an array of attenuator elements adapted to impose an arbitrarily controllable attenuation of incident light, each selected wavelength corresponding to a center-wavelength of a respective attenuator element, and wherein the step of estimating an optimized control setting value comprises, for each attenuator element, a step of calculating an optical attenuation required to minimize the value of the error function at the respective center wavelength.

12. A method as claimed in claim 9, wherein the broadband PDL compensator is a linear PDL compensator having a first optical element adapted to control a wavelength-dependent phase retardation of light traversing the first optical element, and a second optical element adapted to impose an optical attenuation of light traversing the second optical element as a function of polarization state, and wherein the step of estimating an optimized control setting value comprises steps of:

calculating a desired phase retardation of the light traversing the first optical element; and calculating a desired mean polarization angle of light incident on the second optical element.

13. A system for compensating polarization dependent loss (PDL) in an optical communications system having a broadband variable PDL compensator adapted to impose a selected wavelength-dependent attenuation of optical signal traffic, the system comprising:

a) a controller adapted to dynamically control the broadband PDL compensator to differentially attenuate light at each one of a plurality of selected wavelengths, at least one of the selected wavelengths lying between an adjacent pair of channel wavelengths of the optical communications system.

14. A system as claimed in claim 13, further comprising:

a) a monitor adapted to measure a respective performance parameter value indicative of PDL at each channel wavelength of the optical communications system; and b) a signal processor adapted to:

i) calculate estimated performance parameter values at each selected wavelength; and ii) calculate an error function as a function of wavelength based on the estimated performance parameter values.

15. A system as claimed in claim 14, wherein the monitor is provisioned to measure the performance parameter at a monitoring point proximal the broadband PDL compensator.

16. A system as claimed in claim 14, wherein the monitor is provisioned to measure the performance parameter at a monitoring point remote from the broadband PDL compensator.

17. A system as claimed in claim 14, wherein at least the monitor is integrated within a performance monitoring system of the optical communications system.

18. A system as claimed in claim 14, wherein the performance parameter is indirectly indicative of respective channel PDL of each channel of the communications system.

19. A system as claimed in claim 18, wherein the performance parameter comprises, for each channel wavelength, one or more of: a respective channel bit error rate and a respective channel signal to noise ratio.

20. A system as claimed in claim 14, wherein the performance parameter is directly indicative of respective channel PDL of each channel of the communications system.

21. A system as claimed in claim 20, wherein the performance parameter comprises, for each channel wavelength, either one of: a polarization vector of the channel signal; and a respective power level of each orthogonal polarization of the channel signal.

22. A system as claimed in claim 14, wherein the error function is indicative of a difference between the estimated performance parameter values and a reference.

23. A system as claimed in claim 22, wherein the reference comprises either one of: a substantially fixed reference indicative of a desired performance of the optical communications system; and a second set of measured performance parameter values.

24. A system as claimed in claim 23, wherein the measured performance parameter is indicative of respective power levels of each optical mode, and the substantially fixed reference is indicative of a predetermined target power level, whereby the error function is indicative of a difference between the measured power levels of each optical mode and the predetermined target power level.

25. A system as claimed in claim 23, wherein the measured performance parameter is indicative of PDL, and the substantially fixed reference vector is indicative of a desired PDL, whereby the error function is indicative of a difference between the measured and desired PDL values.

26. A system as claimed in claim 13, wherein the controller is adapted to:

estimate an optimized value of at least one control parameter of the broadband PDL compensator, the estimated optimized value being selected to minimize the error function; and apply the estimated optimized control parameter value to the broadband PDL compensator.

27. A system as claimed in claim 22, wherein the controller is provisioned local to the broadband PDL compensator.

28. A system as claimed in claim 22, wherein the controller is provisioned remote from the broadband PDL compensator.

29. A system as claimed in claim 28, wherein the controller is adapted to control a plurality of broadband PDL compensators.

* * * * *